BINARY DATA DETECTING SYSTEM

Filed Dec. 13, 1962 2 Sheets-Sheet 1

INVENTOR
MARCO PADALINO

BY Robert W. Berray

ATTORNEY

Sept. 6, 1966 M. PADALINO 3,271,750

BINARY DATA DETECTING SYSTEM

Filed Dec. 13, 1962 2 Sheets-Sheet 2

United States Patent Office 3,271,750

Patented Sept. 6, 1966

3,271,750

BINARY DATA DETECTING SYSTEM

Marco Padalino, Poughkeepsie, N.Y., assignor to International Business Machines Corporation, New York, N.Y., a corporation of New York Filed Dec. 13, 1962, Ser. No. 244,355
8 Claims. (Cl. 340—174.1)

This invention relates to a binary data detection system, and more particularly, to a means for reproducing magnetically recorded binary information recorded in the form of phase modulated or frequency modulated signals.

Various techniques have been developed for representing and magnetically recording binary information. It is well-known in the art that binary 1's and binary 0's can be represented by any means which will provide two distinguishable states. One form of binary representation is to provide discrete pulses at timed intervals, the binary information being represented by the presence or absence of a pulse, or pulses of opposite polarity. One form of magnetic record utilizing this technique is shown in U.S. Patent 2,436,829, "Bipolar Magnetic Control Record," by R. I. Roth, issued March 2, 1948. This patent shows the representation of binary information on a magnetic record medium wherein the binary information is distinguished by determining the direction of magnetization or polarity of a record medium.

Another means of respresenting binary information is shown in U.S. Patent 2,774,646, "Magnetic Recording Method," by B. F. Phelps, issued December 18, 1956. This shows a binary storage system wherein a magnetizable medium is continuously magnetized in one direction or the other. This magnetic recording technique has become known as a non-return to zero (NRZ or NRZI), distinguishable from the previously mentioned return to zero (RZ) technique in that the magnetic medium is never at zero magnetization. The binary information is stored or represented by causing the binary information to effect a reversal of the magnetization on the record medium. One technique would cause the polarity of magnetization of the record medium to be reversed for each binary 1 to be recorded. Another form of NRZ recording is to cause the magnetic polarization to be reversed whenever the recorded information changes from a binary 1 to a binary 0 or vice versa. This same technique could be used, if desired, in an electrical system wherein a change in the polarity, or voltage level, of an electrical signal would be detected to represent the binary information.

Increased data processing speeds and the resulting need for higher density magnetic recording renders the above techniques less desirable because of timing tolerances and increasing unreliability due to noise. Because of the noise and timing requirements, other techniques for representing binary information, either magnetically recorded or electrically transmitted, are becoming increasingly popular. One technique is shown in U.S. Patent 2,734,186, "Magnetic Storage Systems," by F. C. Williams, issued February 7, 1956. This patent shows a recording technique which has become known as "phase modulation." It is a form of non-return to zero representation of binary information, but control of the flux or electrical signal change is different. In a magnetic storage system using phase modulation techniques, each binary bit cell experiences a change in flux polarity at the center of the bit cell. The direction of the polarity change represents the binary information. For example, a binary 1 would be represented by a change from the positive magnetization to a negative magnetization at the center of a bit cell, and a binary 0 would be represented by a change in magnetization from a negative magnetization to a positive magnetization. In other words, if an electrical signal were produced having a direct correspondence to the flux pattern on the magnetic medium, and this electrical signal were compared to a reference signal, the electrical signal representing the binary information would be in phase or out of phase with the reference depending on the binary information represented.

Another recording technique, closely related to the phase modulating technique, is called "frequency modulation." Frequency modulation is compared with phase modulation and non-return to zero type recordings in an article, "High Density Recording on Magnetic Tape," published October 16, 1959, in Electronics, by McGraw-Hill Publishing Company. Frequency modulation is like phase modulation in that a magnetic flux polarity reversal always takes place at periodic intervals. The distinction between the two techniques is the manner in which the binary information is caused to control the time at which flux reversals take place. A binary 1, for example, would be recorded by causing two adjacent flux reversals to have a first predetermined period. A binary 0 would be represented by adjacent flux reversals having a second predetermined period half as long as the first period. A detection system must be capable of distinguishing between adjacent flux reversals of the first predetermined period or adjacent flux reversals of the second predetermined period.

In both frequency modulation and phase modulation, the flux pattern and the reproduced electrical signal have polarity reversals having periods dependent upon the binary information represented such that a first predetermined period exists between flux polarity reversals or a second predetermined period exists between polarity reversals. The first predetermined period is twice as long as the second predetermined period. In phase modulation, the first predetermined period between flux polarity reversals will occur between adjacent binary bit cells representing unlike binary values. The second predetermined period will exist between polarity reversals when adjacent binary bit cells represent like binary values. In frequency modulation, adjacent polarity reversals having the first predetermined period represent one binary value, and adjacent polarity reversals having the second predetermined period represent the other binary value.

A desirable feature of the phase modulation or frequency modulation techniques is that self clocking of the binary information can be achieved. Since each binary bit cell has a periodic change in state, the change will be detected at the same frequency as the binary information originally recorded. An electrical pulse generated as a result of the flux change at the center of each bit cell can be utilized to produce an electrical wave whose frequency and phase can be initiated by the binary data. The reference phase thus generated can subsequently be utilized to determine the binary information from the electrical signal derived from magnetic information.

Some prior art techniques have been devised for reproducing and detecting binary information utilizing only phase modulation. Others have been devised for reproducing only frequency modulated signals. These systems have taken advantage of the self clocking feature to provide a reference pulse which is applied to electrical signals derived from the magnetic information to sample the polarity of the electrical signal at precise intervals. While these systems provide means for detecting magnetically stored information at higher densities than the RZ or NRZ systems, they still experience difficulties at very high densities. At very high densities, mechanical tolerances are critical so that slight variations in speed of the record medium can cause rapid time displacement of the reproduced electrical signal such that the polarity sensing may produce an erroneous signal. Further, in high density recording, the spacing between the reproducing transducer and the record medium becomes critical. Irregularities in the record medium or in the record guiding system may cause excessive separation between the record and head such that an electrical signal representing a flux change may not be detected. This is especially true in phase modulation where certain binary sequences produce flux changes at a higher frequency than other binary sequences. This again would result in an error condition for prior art sytems.

It is accordingly an object of the present invention to provide an improved binary data detection system capable of higher density operation and greater reliability.

A further object of the present invention resides in the provision of an improved binary data detection system which can be utilized with either a phase modulation technique or frequency modulation technique for representing binary data.

Another object of the present invention resides in the provision of a data detection sytem utilizing phase modulated or frequency modulated representations of the binary data wherein greater variations in time displacement between adjacent signal pulses representing the binary information can be tolerated.

Another object of this invention is the provision of a novel binary data detection system utilizing phase modulated or frequency modulated techniques for representing the binary data wherein loss of some of the data representing signals can be tolerated without disturbing the proper operation of the system.

These and other objects, features and advantages of the present invention are obtained in a preferred embodiment thereof wherein a true and complementary alternating electrical signal is developed which corresponds to magnetic flux polarity changes on a magnetic recording medium which is moved past a reproducing transducer. Depending on the binary information recorded, the period between polarity reversals will have a first predetermined period or a second predetermined period wherein said second predetermined period is half as long as said first period. Each of the alternating electrical signals is delayed an amount less than said second period and delayed an amount greater than said second period. Each of the alternating electrical signals is combined with the associated delayed signals to produce an output pulse when the signals and their associated delayed signals have the same polarity. Means are then provided to combine the output pulses from each of the previously mentioned combining means to produce a series of output pulses which correspond to detection of adjacent flux polarity reversals having said first predetermined period.

The foregoing and other objects, features and advantages of the invention will be apparent from the following more particular description of a preferred embodiment of the invention, as illustrated in the accompanying drawings.

Most prior art systems utilized for recovering information from phase modulated magnetic recordings require precise timing and reproduction of all flux polarity reversals including the shorter period reversals as well as the long period reversals. The subject invention provides circuitry which concentrates on detecting the long period between flux polarity reversals. The shorter period flux polarity reversals can be disregarded. This is a most desirable feature in that it has been recognized that with a given magnetic head configuration, magnetic recording speed and spacing between the magnetic head and magnetic record, a greater amplitude electrical signal is developed when the system is reproducing the information represented by adjacent flux polarity reversals having the long period.

Prior art systems also have been troubled with "phase shift" resulting from frequency or phase modulation. The prior art systems rely heavily on the fact that the reproduced electrical signal can provide an accurate reference electrical signal to be utilized to recover the binary information. However, it has been discovered that when adjacent flux polarity reversals having the longer period are encountered after a series of flux polarity reversals having the shorter period, the electrical representation of the reversals experiences a shift, such that the period between polarity reversals of the electrical signal representing the long period between flux reversals is reduced by an amount known as phase shift. The subject invention has been devised to provide correct output information even though a certain amount of phase shift occurs.

Figure 1:
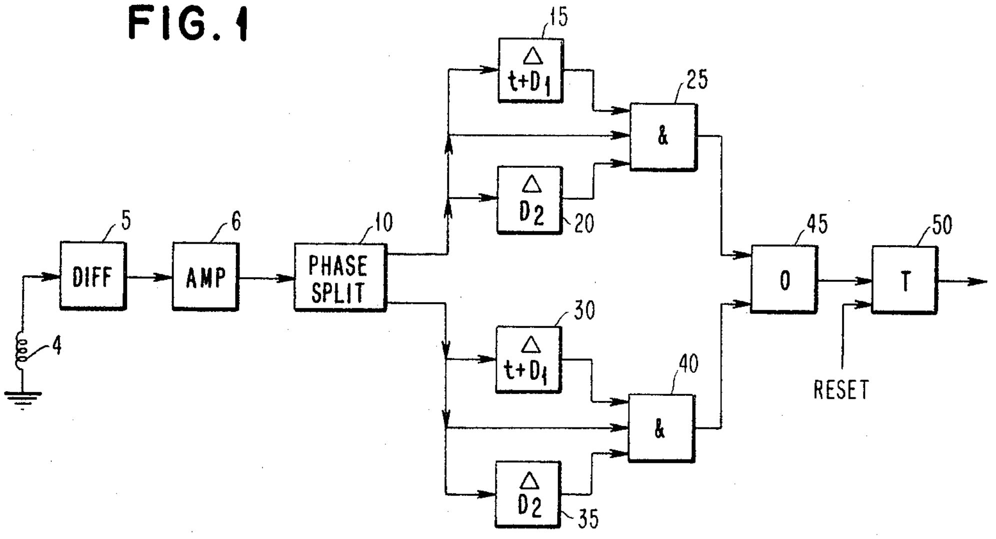
FIGURE 1 shows the logic required to develop a two-level output signal representing binary information from magnetically recorded binary information utilizing either a phase modulation or frequency recording modulation technique.

FIGURE 1 shows the logic required to practice the instant invention. When a magnetic record containing binary information represented by phase modulation is transported past a transducer 4, an electrical signal is produced. The output of the transducer 4 is applied to a differentiator 5 and then applied to an amplifier 6. The output of amplifier 6 is an alternating electrical signal which corresponds to the magnetic flux pattern contained on the magnetic record. The output of amplifier 6 is applied to a phase splitter 10 which produces a true and complementary electrical signal corresponding to the flux pattern on the record medium. The true alternating electrical signal is applied to a first delay 15 and a second delay 20. The delayed signals from delay devices 15 and 20 and the true signal from splitter 10 are combined at an AND circuit 25. The output of AND circuit 25 is a pulse which occurs when the true alternating electrical signal, the delayed signal from 15 and the delayed signal from 20 all have a positive polarity, and represents detection of adjacent flux polarity reversals having a first predetermined period and a predetermined sequence.

The complementary alternating electrical signal is applied to a delay device 30 and a delay device 35. The complementary alternating electrical signal, the output of delay 30 and the output of delay 35 are combined at an AND circuit 40 to produce an output pulse when the complementary alternating electrical signal and the associated delayed signals from 30 and 35 have a positive polarity, and represents detection of adjacent flux polarity reversals having a first predetermined period and a sequence opposite to said predetermined sequence. The outputs of AND circuits 25 and 40 are combined at an OR circuit 45 which will produce an output pulse corresponding to each time a pair of adjacent flux polarity reversals are detected having the first predetermined period. A trigger 50 receives the outputs from OR circuit 45 at the complement input. The trigger 50 is initially reset to represent a binary 0. The output of OR circuit 45 is applied to the complement input such that trigger 50 will change stable state each time a pulse is applied.

The output of AND circuit 25 is a pulse which represents a change of the binary information from a binary 0 to a binary 1. The output of AND circuit 40 is a pulse which represents a change in the binary information from binary 1 to binary 0.

Figure 2:
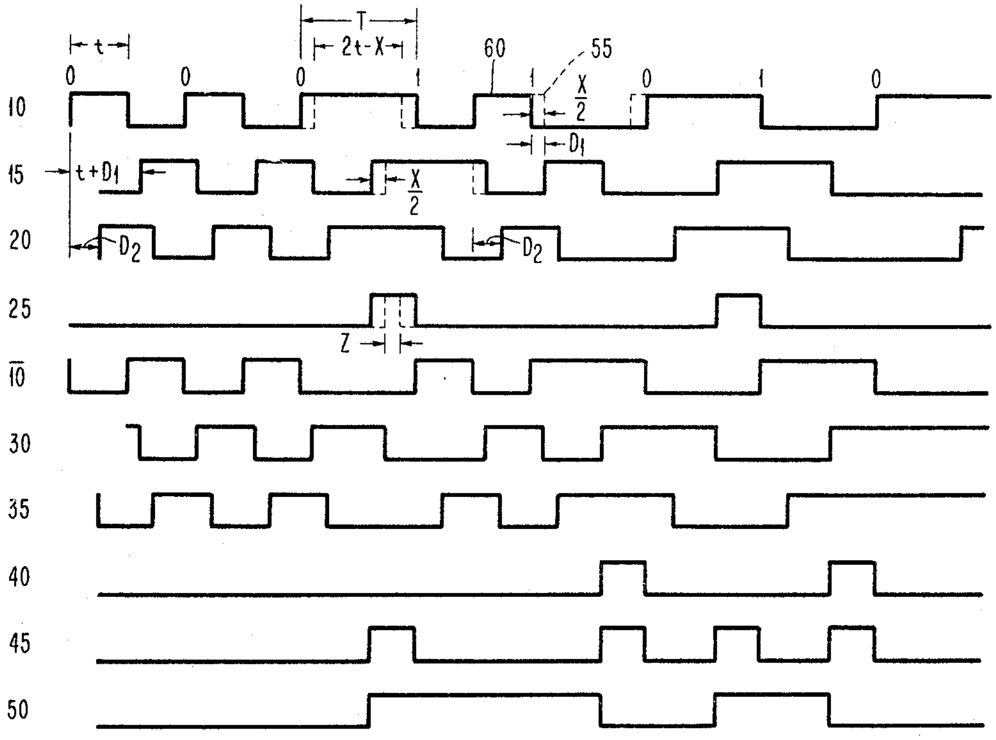
FIGURE 2 shows wave forms of electrical signals taken from various logic blocks shown in FIGURE 1.

The relationship between the first predetermined period between flux reversals which occur when adjacent binary bits differ, the second predetermined period between flux polarity reversals when adjacent binary information is the same, the delays, the phase shift to be encountered, and the pulse required at the input of trigger 50 are shown in FIGURE 2. In FIGURE 2, the wave forms have been labeled with the same numeral as the block in FIGURE 1 which produces the wave form. The phase splitter 10 produces a true signal 10 and a complementary signal labeled in FIGURE 2 as $\overline{\mathbf{10}}$. The binary information represented by the flux pattern and the corresponding alternating electrical signal is shown above wave form 10. It can be seen that when adjacent binary values are the same, a shorter period exists between reversals than when adjacent binary values are different.

Various notations on the wave forms of FIGURE 2 are identified below:

T—a first predetermined period which exists between polarity reversals when adjacent binary information is different;

$t$—a second predetermined period which exists between adjacent polarity reversals when adjacent binary information is the same;

X—the "phase shift" which causes a narrowing of the first predetermined period T in the alternating electrical signal;

$t+D1$—the delay provided by delay devices 15 and 30 of FIGURE 1;

D2—the delay provided by delay devices 20 and 35 of FIGURE 1;

Z—the period or width of pulse required from OR circuit 45 to cause trigger 50 to change stable states.

It is the purpose of this invention to detect when the first predetermined period T exists, so wave form 10 will be examined where period T exists between the change from binary 0 to binary 1. In some prior art systems, the detection of period T would be accomplished by delaying wave form 10 by an amount equal to $t$. By doing this, the wave forms 10 and 15 would be combined to detect when the last half of period T is the same polarity as the first half of the delayed signal. In the prior art utilizing this technique, however, certain phase shift conditions could not be tolerated without producing an erroneous output pulse.

A further observation of wave forms 10 and 15 in connection with the minimum width pulse 25 required to operate trigger 50 shows certain relationships which can exist. An additional delay D1 could be applied to wave form 15 which in combination with a certain amount of phase shift X could still provide the necessary width Z for pulse 25. The pull period T of wave form 10 could be reduced by the total phase shift X providing a pulse width $2t-X$. This period could be reduced by an amount equal to the wave form 10 delayed by an amount equal to $t$ plus an additional delay D1. In addition, one half of the total phase shift could be removed and still retain an output pulse 25 having a minimum period Z. This relationship and other relationships will be shown in the equations to follow.

In order to provide a pulse to the trigger 50 having a minimum width Z the following relationship must exist:

$$2t-X-(t+D1+X/2)\geqq Z \tag{1}$$

or $$t-3X/2-D1\geqq Z \tag{2}$$

In order to prevent an erroneous output as a result of phase shift that might occur such as at point 55 of wave form 10 in FIGURE 2, delay D1 must be greater than $X/2$ therefore:

$$D1\geqq X/2 \tag{3}$$

so that Equation 2 becomes:

$$t-(3X/2+X/2)\geqq Z \tag{4}$$

or $$t-2X\geqq Z \tag{5}$$

Equation 5 can be expressed to show the phase shift X that can be tolerated:

$$t/2-Z/2\geqq X \tag{6}$$

or $$T/4-Z/2\geqq X \tag{7}$$

In a preferred embodiment of the invention, $T=6$ microseconds and Z is 0.1 microsecond, therefore using Equation 7;

$$1.5 \text{ microseconds}-0.05 \text{ microsecond}=X \tag{8}$$

The phase shift X that can be tolerated is therefore approximately equal to $T/4$.

If the phase shift X to be tolerated is $T/4$ then:

$$D1\geqq X/2\geqq T/8 \tag{9}$$

The delay D1 is shown in FIGURE 2 to be $T/8$ such that wave form 15 produced by delay line 15 of FIGURE 1 is delayed a total amount equal to ⅝ the period T.

The alternating electrical signal 10 is also delayed by an amount equal to D2 shown in wave form 20 of FIGURE 2. The wave form 20 is provided to prevent wave forms 10 and 15 from combining to produce an output such as at point 60 of wave form 10. It can be seen from FIGURE 2, therefore:

$$D2\geqq D1\geqq X/2 \tag{10}$$

In the preferred embodiment of the invention, $D2-T/4$, $D1=T/8$ and $X=T/4$.

Wave forms 10, 15, and 20 are combined at AND circuit 25 to produce the pulse to trigger 50 for all adjacent polarity reversals representing the change in the recorded binary information from binary 0 to binary 1. The complementary wave form $\overline{\mathbf{10}}$ is subjected to the same delays as the true wave form 10 to provide from AND circuit 40 pulses to the trigger 50 representing adjacent polarity reversals for recorded binary information wherein the binary value changes from binary 1 to binary 0. By combining the pulses produced by the combining action of AND circuit 25 and AND circuit 40 at OR circuit 45, trigger 50 receives a complementing input whenever the binary information changes from one binary value to the other. If the trigger 50 is reset to binary 0 at the beginning of each record, one stable state of trigger 50 can represent binary 0's and the opposite stable state of trigger 50 will represent binary 1's.

Figure 3:
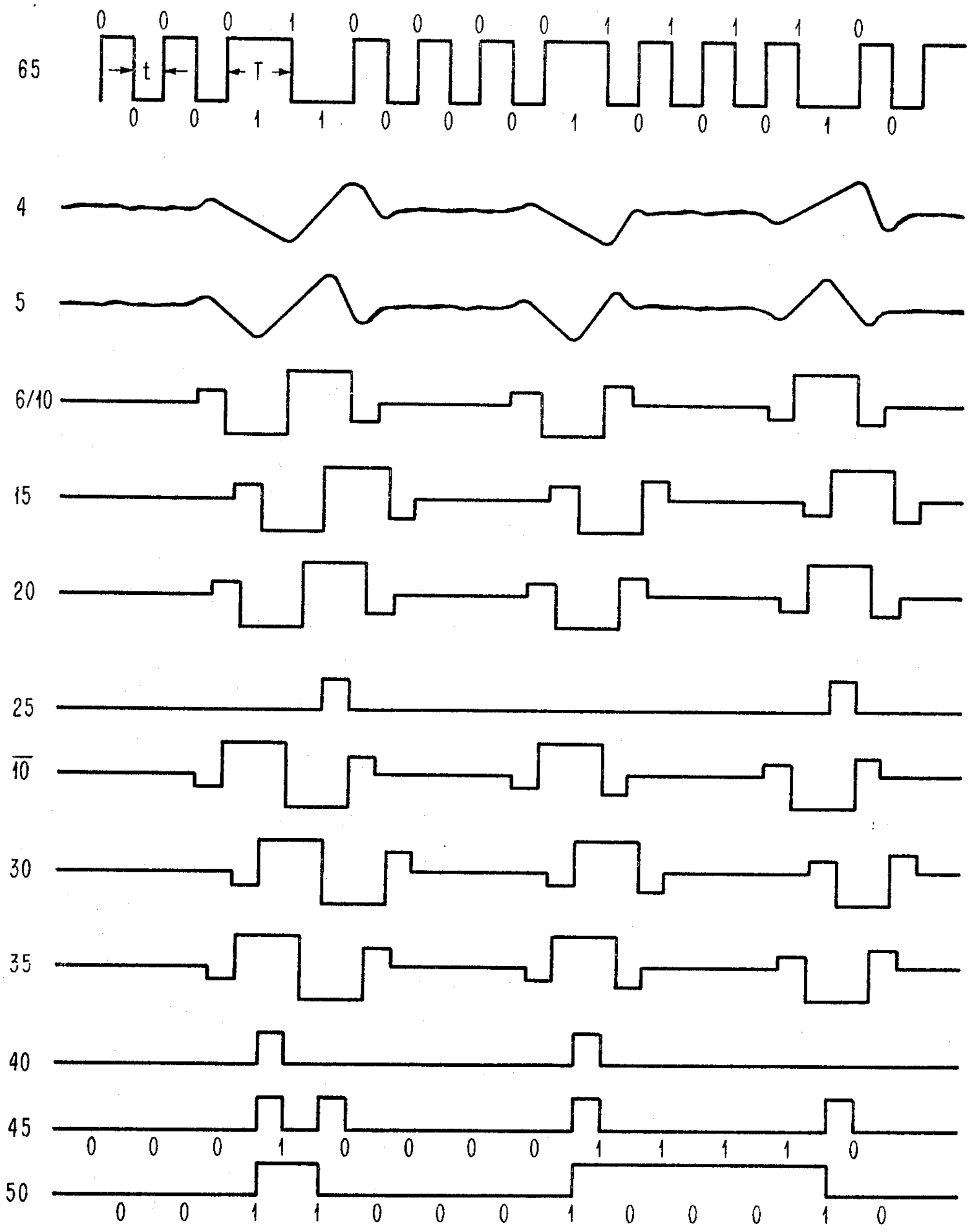
FIGURE 3 shows various wave forms utilized in describing how the logic of FIGURE 1 can be utilized with either phase modulation or frequency modulation recording techniques.

In FIGURE 3, wave forms are shown to represent how the logic of FIGURE 1 can be utilized to reproduce binary information represented by phase modulation or frequency modulation. Wave form 65 represents the magnetic flux pattern on a record medium. The binary notations above wave form 65 show how the flux pattern can represent binary information in phase modulation recording. The binary notations below wave form 65 show how the flux pattern can be utilized to represent binary information utilizing frequency modulation. In phase modulation, detection of the predetermined period T represents a change from one binary value to the other binary value. In frequency modulation, detection of the first predetermined period T represents a particular one of the binary values.

Wave form 4 of FIGURE 3 represents the output of transducer 4 of FIGURE 1. In phase modulation, irregularities in the record or record-to-transducer spacing may cause complete loss of detection of flux polarity reversals having the shorter period $t$. However, in phase modulation it is discovered that flux polarity reversals having the longer period T can be detected to provide wave form 4. In frequency modulation, the transducer 4 dimensions or suitable filtering can be provided to reject the higher frequency flux polarity reversals while accepting the flux polarity reversals having the longer period T. When the output of transducer 4 is differentiated by differentiator 5 of FIGURE 1, wave form 5 of FIGURE 3 results. Amplification by amplifier 6 of FIGURE 1 provides a square wave alternating electrical signal corresponding to each series of flux polarity reversals having the longer period T. The true and complementary alternating electrical signals provided by phase splitter 10 of FIGURE 1 are subjected to the same delays as discussed in connection with FIGURE 2 to provide a series of output pulses from OR circuit 45 representing detection of each of the flux polarity reversals having the first predetermined period T. When the output pulses of OR circuit 45 are applied to the complement input of trigger 50, the stable states of trigger 50 represent the binary information recorded. The binary notations above wave form 50 show how the stable states of trigger 50 represent binary information recorded by phase modulation. The binary notations below wave form 50 show how the stable states of trigger 50 represent the binary information that has been recorded by frequency modulation. In frequency modulation, it can be seen that the trigger 50 changes stable states, or there is a pulse at 45 whenever a binary 1 is represented. This type of representation is the same as the previously referred to non-return to zero techniques wherein a change in stable state is detected to represent a particular one of the binary values.

It has thus been shown, that a single circuit can be utilized to reproduce binary information represented by either phase modulation or frequency modulation. It is further evident that the circuit is capable of accurate reproduction of the binary information even though certain amounts of phase shift occur in the derived electrical signals from a magnetically recorded flux pattern. It is further evident, that the desired reproduced information can be obtained without relying on the difficult to obtain signals which occur. The entire binary information is obtained however from detection of a portion of the recorded flux pattern which is the easiest to detect.

While the invention has been particularly shown and described with reference to a preferred embodiment thereof, it will be understood by those skilled in the art that various changes in form and details may be made therein without departing from the spirit and scope of the invention.

What is claimed is:

1. A reproducing system for binary data recorded on a magnetic medium movable past a transducer, wherein a first predetermined period exists between flux polarity reversals or a second predetermined period exists between flux polarity reversals dependent on the binary data recorded, the second period being half as long as said first period, comprising:

means deriving alternating true and complementary data signals corresponding to the magnetic state of said medium, means responsive to said true data signal for producing an output pulse indicative of adjacent flux reversals having said first period, the direction of flux reversals having a predetermined sequence, means responsive to said complementary data signal for producing an output pulse indicative of adjacent flux reversals having said first period, the direction of flux reversals having a sequence opposite to said predetermined sequence, and means combining said true and complementary data signal responsive means to produce an output signal indicative of each sequence of flux reversals having said first predetermined period.

2. A reproducing system for binary data recorded on a magnetic medium movable past a transducer, wherein a first predetermined period exists between flux polarity reversals or a second predetermined period exists between flux polarity reversals dependent on the binary data recorded, the second period being half as long as said first period, comprising:

means deriving alternating true and complementary data signals corresponding to the magnetic state of said medium, means delaying each of said data signals less than half said first period, means delaying each of said data signals more than half said first period, and means combining said data signal and said delayed signals to produce a signal corresponding to detection of adjacent flux reversals having said first predetermined period.

3. A reproducing system for binary data recorded on a magnetic medium movable past a transducer, wherein a first predetermined period exists between flux polarity reversals or a second predetermined period exists between flux polarity reversals dependent on the binary data recorded, the second period being half as long as said first period, comprising:

means deriving alternating true and complementary data signals corresponding to the magnetic state of said medium, means delaying each of said data signals substantially one-fourth said first period, means delaying each of said data signals substantially five-eighths said first period, and means combining said data signals and said delayed signals to produce a signal corresponding to detection of adjacent flux reversals having said first predetermined period.

4. A reproducing system for binary data recorded on a magnetic medium movable past a transducer, wherein a first predetermined period exists between flux polarity reversals or a second predetermined period exists between flux polarity reversals dependent on the binary data recorded, the second period being half as long as said first period, comprising:

means deriving alternating true and complementary data signals corresponding to the magnetic state of said medium, means delaying said true and complementary data signals substantially one-fourth said first period, means delaying said true and complementary data signals substantially five-eighths said first period, first and second AND circuits, said first AND circuit connected to receive said true data signal and said associated delayed signals to provide an output pulse when said signals have a like polarity, said second AND circuit connected to receive said complementary data signal and said associated delayed signals to provide an output pulse when said signals have a like polarity, and an OR circuit, receiving the outputs of said first and second AND circuits, to produce an output pulse indicative of adjacent flux polarity reversals having said first period.

5. A reproducing system for binary data recorded on a magnetic medium movable past a transducer, wherein a first predetermined period T exists between flux polarity reversals or a second predetermined period $t$ exists between flux polarity reversals dependent on the binary data recorded, the second period being half as long as said first period, comprising:

means deriving alternating true and complementary data signals corresponding to the magnetic state of said medium, said data signals being subjected to adverse effects causing the corresponding predetermined period T of said data signals to be reduced by an amount X, means delaying each of said data signals a period D2 which is less than said second period $t$, means delaying each of said data signals by a period equal to said second period $t$ plus an additional period D1, such that $D2 \geqq D1 \geqq X/2$, and means combining said data signals and said delayed signals to produce an output pulse corresponding to detection of each of the adjacent flux reversals having said first predetermined period T, wherein said output pulse has a minimum period Z, such that $t-2X \geqq Z$.

6. A binary data detection system for binary data represented by an alternating electrical signal, wherein a first predetermined period exists between polarity reversals or a second predetermined period exists between polarity reversals dependent on the binary data represented, the second period being half as long as said first period, comprising:

means deriving alternating true and complementary data signals from the data representing electrical signal, first means delaying said true and complementary data signals less than half said first period, second means delaying said true and complementary data signals more than half said first period, the additional delay over half said period being less than the delay provided by said first delay means, means combining each of said data signals with said associated delayed signals to produce a signal corresponding to detection of a like polarity of all said signals, and means, responsive to the signal from each of said combining means, for producing an output pulse indicative of all adjacent polarity reversals having said first period.

7. A binary data detection system for binary data represented by an alternating electrical signal, wherein a first predetermined period exists between polarity reversals or a second predetermined period exists between polarity reversals dependent on the binary data represented, the second period being half as long as said first period, comprising:

means deriving alternating true and complementary data signals from the data representing electrical signal, means delaying said true and complementary data signals substantially one-fourth said first period, means delaying said true and complementary data signals substantially five-eighths said first period, and means combining said data signals and said associated delayed signals to produce a signal corresponding to detection of adjacent polarity reversals having said first predetermined period.

8. A binary data detection system for binary data represented by an alternating electrical signal, wherein a first predetermined period exists between polarity reversals or a second predetermined period exists between polarity reversals dependent on the binary data represented, the second period being half as long as said first period, comprising:

means deriving alternating true and complementary data signals from the data representing electrical signal, means delaying said true and complementary data signals substantially one-fourth said first period, means delaying said true and complementary data signals substantially five-eighths said first period, first and second AND circuits, said first AND circuit connected to receive said true data signal and said associated delayed signals to provide an output pulse when said signals have a like polarity, said second AND circuit connected to receive said complementary data signal and said associated delayed signals to provide an output pulse when said signals have a like polarity, and an OR circuit, receiving the outputs of said first and second AND circuits, to produce an output pulse indicative of adjacent polarity reversals having said first period.

References Cited by the Examiner

UNITED STATES PATENTS 3,217,329 11/1965 Gabor -------------- 346—74

BERNARD KONICK, *Primary Examiner.*

A. I. NEUSTADT, *Assistant Examiner.*